US009135669B2

(12) United States Patent
Roemerman et al.

(10) Patent No.: US 9,135,669 B2
(45) Date of Patent: *Sep. 15, 2015

(54) INTERROGATION SYSTEM EMPLOYING PRIOR KNOWLEDGE ABOUT AN OBJECT TO DISCERN AN IDENTITY THEREOF

(75) Inventors: Steven D. Roemerman, Highland Village, TX (US); John P. Volpi, Garland, TX (US); Logan Scott, Breckenridge, CO (US)

(73) Assignee: Lone Star IP Holdings, LP, Addison, TX (US)

( * ) Notice: Subject to any disclaimer, the term of this patent is extended or adjusted under 35 U.S.C. 154(b) by 210 days.

This patent is subject to a terminal disclaimer.

(21) Appl. No.: 12/396,207

(22) Filed: Mar. 2, 2009

(65) Prior Publication Data

US 2009/0160605 A1 Jun. 25, 2009

Related U.S. Application Data

(63) Continuation of application No. 11/238,225, filed on Sep. 29, 2005, now Pat. No. 7,501,948.

(51) Int. Cl.
*G08B 13/14* (2006.01)
*G06Q 50/30* (2012.01)
*G06Q 10/08* (2012.01)

(52) U.S. Cl.
CPC .............. *G06Q 50/30* (2013.01); *G06Q 10/08* (2013.01); *G06Q 10/087* (2013.01)

(58) Field of Classification Search
USPC .......................................... 340/572.1–572.9
See application file for complete search history.

(56) References Cited

U.S. PATENT DOCUMENTS

| 3,367,431 A | 2/1968 | Baker |
| 3,564,662 A | 2/1971 | Dold |
| 3,675,190 A | 7/1972 | Auer, Jr. et al. |
| 3,802,555 A | 4/1974 | Grasty et al. |
| 3,941,132 A | 3/1976 | Lenaghan |
| 3,965,907 A | 6/1976 | Hardy et al. |
| 4,114,601 A | 9/1978 | Abels |
| 4,151,913 A | 5/1979 | Freitag |
| 4,164,320 A | 8/1979 | Irazoqui et al. |
| 4,193,405 A | 3/1980 | Abels |
| 4,213,197 A | 7/1980 | Mágori |

(Continued)

FOREIGN PATENT DOCUMENTS

| DE | 199 23 983 A1 | 12/2000 |
| EP | 0 639 817 A1 | 2/1995 |

(Continued)

OTHER PUBLICATIONS

Technovelgy.com, Electronic product code, Sep. 24, 2004.*

(Continued)

*Primary Examiner* — Ojiako Nwugo
(74) *Attorney, Agent, or Firm* — Boisbrun Hofman, PLLC (57) ABSTRACT

An interrogation system employable with an object having a radio frequency identification (RFID) tag and method of operating the same. In one embodiment, the interrogation system includes a database having prior knowledge about the object, and an interrogator that scans the RFID tag and discerns additional information therefrom about the object. The interrogator still further includes a control system that identifies the object based on the prior knowledge and the additional information.

20 Claims, 4 Drawing Sheets

(56) References Cited

U.S. PATENT DOCUMENTS

| | | |
|---|---|---|
| 4,249,128 A | 2/1981 | Karbowski |
| 4,289,032 A | 9/1981 | Tominaga et al. |
| 4,295,537 A | 10/1981 | McAvinn et al. |
| 4,342,391 A | 8/1982 | Schainholz |
| 4,359,015 A | 11/1982 | Ritchey |
| 4,361,231 A | 11/1982 | Patience |
| 4,422,548 A | 12/1983 | Cheesman et al. |
| 4,422,584 A | 12/1983 | Dashnier et al. |
| 4,498,076 A | 2/1985 | Lichtblau |
| 4,510,489 A | 4/1985 | Anderson, III et al. |
| 4,514,692 A | 4/1985 | Johnson et al. |
| 4,526,177 A | 7/1985 | Rudy et al. |
| 4,541,992 A | 9/1985 | Jerge et al. |
| 4,549,184 A | 10/1985 | Boles et al. |
| 4,643,303 A | 2/1987 | Arp et al. |
| 4,650,464 A | 3/1987 | Ruiz et al. |
| 4,658,818 A | 4/1987 | Miller, Jr. et al. |
| 4,821,023 A | 4/1989 | Parks |
| 4,832,198 A | 5/1989 | Alikhan |
| 4,855,909 A | 8/1989 | Vincent et al. |
| 4,857,713 A | 8/1989 | Brown |
| 4,887,715 A | 12/1989 | Spahn et al. |
| 4,889,230 A | 12/1989 | Zachry |
| 4,903,837 A | 2/1990 | Duello |
| 4,907,000 A | 3/1990 | Tabourier |
| 4,922,922 A | 5/1990 | Pollock et al. |
| 4,943,939 A | 7/1990 | Hoover |
| 5,009,275 A | 4/1991 | Sheehan |
| 5,031,642 A | 7/1991 | Nosek |
| 5,057,095 A | 10/1991 | Fabian |
| 5,103,210 A | 4/1992 | Rode et al. |
| 5,105,829 A | 4/1992 | Fabian et al. |
| 5,107,862 A | 4/1992 | Fabian et al. |
| 5,186,322 A | 2/1993 | Harreld et al. |
| 5,188,126 A | 2/1993 | Fabian et al. |
| 5,190,059 A | 3/1993 | Fabian et al. |
| 5,231,273 A | 7/1993 | Caswell et al. |
| 5,241,568 A | 8/1993 | Fernandez et al. |
| 5,284,632 A | 2/1994 | Kudla et al. |
| 5,300,120 A | 4/1994 | Knapp et al. |
| 5,329,944 A | 7/1994 | Fabian et al. |
| 5,353,011 A | 10/1994 | Wheeler et al. |
| 5,354,975 A | 10/1994 | Ishibashi et al. |
| 5,357,240 A | 10/1994 | Sanford et al. |
| 5,374,261 A | 12/1994 | Yoon |
| 5,381,137 A | 1/1995 | Ghaem et al. |
| 5,382,784 A | 1/1995 | Eberhardt |
| 5,414,730 A | 5/1995 | Lundquist et al. |
| 5,433,929 A | 7/1995 | Riihimaki et al. |
| 5,443,082 A | 8/1995 | Mewburn |
| 5,451,380 A | 9/1995 | Zinnanti |
| 5,456,718 A | 10/1995 | Szymaitis |
| 5,460,178 A | 10/1995 | Hudon et al. |
| 5,491,468 A | 2/1996 | Everett et al. |
| 5,528,232 A | 6/1996 | Verma et al. |
| 5,588,032 A | 12/1996 | Johnson et al. |
| 5,594,384 A | 1/1997 | Carroll et al. |
| 5,610,811 A | 3/1997 | Honda |
| 5,629,498 A | 5/1997 | Pollock et al. |
| 5,650,596 A | 7/1997 | Morris et al. |
| 5,689,239 A | 11/1997 | Turner et al. |
| 5,781,442 A | 7/1998 | Engleson et al. |
| 5,792,138 A | 8/1998 | Shipp |
| 5,793,324 A | 8/1998 | Aslanidis et al. |
| 5,801,371 A | 9/1998 | Kahn et al. |
| 5,827,215 A | 10/1998 | Yoon |
| 5,864,323 A | 1/1999 | Berthon |
| 5,904,708 A | 5/1999 | Goedeke |
| 5,923,001 A | 7/1999 | Morris et al. |
| 5,931,824 A | 8/1999 | Stewart et al. |
| 5,979,941 A | 11/1999 | Mosher, Jr. et al. |
| 5,986,550 A | 11/1999 | Rapaport et al. |
| 6,026,818 A | 2/2000 | Blair et al. |
| 6,037,870 A | 3/2000 | Alessandro |
| 6,046,683 A | 4/2000 | Pidwerbetsky et al. |
| 6,097,374 A | 8/2000 | Howard |
| 6,150,921 A | 11/2000 | Werb et al. |
| D435,557 S | 12/2000 | Eisenberg et al. |
| 6,169,483 B1 | 1/2001 | Ghaffari et al. |
| 6,211,672 B1 | 4/2001 | Bauman et al. |
| 6,230,888 B1 | 5/2001 | Frieze et al. |
| 6,264,106 B1 | 7/2001 | Bridgelall |
| 6,265,962 B1 | 7/2001 | Black et al. |
| 6,294,997 B1 | 9/2001 | Paratore et al. |
| 6,300,872 B1 | 10/2001 | Mathias et al. |
| 6,305,605 B1 | 10/2001 | Goetz et al. |
| 6,307,517 B1 | 10/2001 | Lee |
| 6,342,187 B1 | 1/2002 | Jacob et al. |
| 6,366,206 B1 | 4/2002 | Ishikawa et al. |
| 6,377,176 B1 | 4/2002 | Lee |
| 6,394,355 B1 | 5/2002 | Schlieffers et al. |
| D459,246 S | 6/2002 | Power et al. |
| 6,424,262 B2 | 7/2002 | Garber et al. |
| 6,424,263 B1 | 7/2002 | Lee et al. |
| 6,429,776 B1 | 8/2002 | Alicot et al. |
| 6,446,794 B1 | 9/2002 | Hacikyan |
| 6,448,886 B2 | 9/2002 | Garber et al. |
| 6,483,427 B1 | 11/2002 | Werb |
| 6,484,050 B1 | 11/2002 | Carroll et al. |
| 6,486,783 B1 | 11/2002 | Hausladen et al. |
| 6,492,905 B2 | 12/2002 | Mathias et al. |
| 6,492,933 B1 | 12/2002 | McEwan |
| 6,496,112 B1 | 12/2002 | Vega |
| 6,496,113 B2 | 12/2002 | Lee et al. |
| 6,496,806 B1 * | 12/2002 | Horwitz et al. ............... 705/28 |
| 6,509,217 B1 | 1/2003 | Reddy |
| 6,512,478 B1 | 1/2003 | Chien |
| 6,515,591 B2 | 2/2003 | Lake et al. |
| 6,516,272 B2 | 2/2003 | Lin |
| 6,523,681 B1 | 2/2003 | Hacikyan |
| 6,535,175 B2 | 3/2003 | Brady et al. |
| 6,600,421 B2 | 7/2003 | Freeman |
| 6,600,905 B2 | 7/2003 | Greeff et al. |
| 6,609,656 B1 | 8/2003 | Elledge |
| 6,618,024 B1 | 9/2003 | Adair et al. |
| 6,659,344 B2 | 12/2003 | Otto et al. |
| 6,686,829 B1 | 2/2004 | Hohberger et al. |
| 6,696,954 B2 | 2/2004 | Chung |
| 6,698,285 B1 | 3/2004 | Hacikyan |
| 6,708,881 B2 | 3/2004 | Hartmann |
| 6,720,866 B1 | 4/2004 | Sorrells et al. |
| 6,724,309 B2 | 4/2004 | Grose et al. |
| 6,753,782 B2 | 6/2004 | Power |
| 6,756,880 B2 | 6/2004 | Hartmann |
| 6,757,068 B2 | 6/2004 | Foxlin |
| 6,759,789 B2 | 7/2004 | Hartmann |
| 6,759,968 B2 | 7/2004 | Zerolf |
| 6,774,782 B2 | 8/2004 | Runyon et al. |
| 6,777,623 B2 | 8/2004 | Ballard |
| 6,794,000 B2 | 9/2004 | Adams et al. |
| 6,812,707 B2 | 11/2004 | Yonezawa et al. |
| 6,812,842 B2 | 11/2004 | Dimmer |
| 6,822,570 B2 | 11/2004 | Dimmer et al. |
| 6,838,874 B1 | 1/2005 | Franklin |
| 6,838,990 B2 | 1/2005 | Dimmer |
| 6,853,194 B2 | 2/2005 | Nelson et al. |
| 6,859,190 B2 | 2/2005 | Pillai et al. |
| 6,861,954 B2 | 3/2005 | Levin |
| 6,940,408 B2 | 9/2005 | Ferguson et al. |
| 6,958,340 B2 | 10/2005 | Hartman et al. |
| 6,959,031 B2 | 10/2005 | Haynes et al. |
| 6,966,493 B2 | 11/2005 | Hartmann |
| 6,967,574 B1 | 11/2005 | Nelson |
| 6,987,451 B2 | 1/2006 | McKeown et al. |
| 6,989,750 B2 | 1/2006 | Shanks et al. |
| 6,992,952 B2 | 1/2006 | Endo et al. |
| 6,998,541 B2 | 2/2006 | Morris et al. |
| 7,001,366 B2 | 2/2006 | Ballard |
| 7,005,968 B1 | 2/2006 | Bridgelall |
| 7,009,496 B2 | 3/2006 | Arneson et al. |
| 7,009,519 B2 | 3/2006 | Leonard et al. |
| 7,012,529 B2 | 3/2006 | Sajkowsky |
| 7,014,100 B2 | 3/2006 | Zierolf |
| 7,019,650 B2 | 3/2006 | Volpi et al. |

(56) References Cited

U.S. PATENT DOCUMENTS

| | | | |
|---|---|---|---|
| 7,023,356 B2 | 4/2006 | Burkhardt et al. |
| 7,030,762 B2 | 4/2006 | Hartmann et al. |
| 7,053,755 B2 | 5/2006 | Atkins et al. |
| 7,079,034 B2 | 7/2006 | Stilp |
| 7,095,311 B2 | 8/2006 | Coates et al. |
| 7,096,279 B2 | 8/2006 | Hartmann et al. |
| 7,100,052 B2 | 8/2006 | Ghazarian |
| 7,113,125 B2 | 9/2006 | Le Sesne |
| 7,126,479 B2 | 10/2006 | Claessens et al. |
| 7,129,840 B2 | 10/2006 | Hull et al. |
| 7,148,803 B2 | 12/2006 | Bandy et al. |
| 7,155,340 B2 | 12/2006 | Churan |
| 7,158,034 B2 | 1/2007 | Corbett, Jr. |
| 7,158,598 B2 | 1/2007 | Schetelig et al. |
| 7,159,654 B2 | 1/2007 | Ellison et al. |
| 7,161,470 B2 | 1/2007 | Berquist et al. |
| 7,172,117 B2 | 2/2007 | Moore |
| 7,193,504 B2 | 3/2007 | Carrender et al. |
| 7,245,227 B2 | 7/2007 | Winter et al. |
| 7,301,648 B2 | 11/2007 | Foxlin |
| 7,307,530 B2 | 12/2007 | Fabian et al. |
| 7,318,001 B2 | 1/2008 | Clark |
| 7,336,152 B2 | 2/2008 | Horwitz et al. |
| 7,411,506 B2 | 8/2008 | Volpi et al. |
| 7,411,921 B2 | 8/2008 | Strong et al. |
| 7,420,468 B2 | 9/2008 | Fabian et al. |
| 7,464,713 B2 | 12/2008 | Fabian et al. |
| 7,501,948 B2 | 3/2009 | Roemerman et al. |
| 7,525,431 B2 | 4/2009 | Britton, Jr. et al. |
| 7,540,287 B2 | 6/2009 | Chole |
| 7,541,933 B2 | 6/2009 | Volpi et al. |
| 7,557,711 B2 | 7/2009 | Volpi et al. |
| 7,567,178 B2 | 7/2009 | Boyer et al. |
| 7,573,370 B2 | 8/2009 | Becker et al. |
| 7,600,613 B2 | 10/2009 | Kang et al. |
| 7,671,744 B2 | 3/2010 | Volpi et al. |
| 7,755,491 B2 | 7/2010 | Volpi et al. |
| 7,760,097 B2 | 7/2010 | Volpi et al. |
| 7,764,178 B2 | 7/2010 | Volpi et al. |
| 7,893,840 B2 | 2/2011 | Volpi et al. |
| 7,948,357 B2 | 5/2011 | Bodin |
| 8,105,296 B2 | 1/2012 | Morris et al. |
| 8,174,366 B2 | 5/2012 | Volpi et al. |
| 8,284,034 B2 | 10/2012 | Stewart et al. |
| 2001/0004237 A1 | 6/2001 | Lake et al. |
| 2001/0008390 A1 | 7/2001 | Berquist et al. |
| 2001/0013830 A1 | 8/2001 | Garber et al. |
| 2001/0034530 A1 | 10/2001 | Malackowski et al. |
| 2002/0005774 A1 | 1/2002 | Rudolph et al. |
| 2002/0008623 A1 | 1/2002 | Garber et al. |
| 2002/0010679 A1 | 1/2002 | Felsher |
| 2002/0044096 A1 | 4/2002 | Chung |
| 2002/0048330 A1 | 4/2002 | Schetelig et al. |
| 2002/0060630 A1 | 5/2002 | Power |
| 2002/0067263 A1 | 6/2002 | Tafoya et al. |
| 2002/0070845 A1 | 6/2002 | Reisinger et al. |
| 2002/0093431 A1 | 7/2002 | Zierolf |
| 2002/0105424 A1 | 8/2002 | Alicot et al. |
| 2002/0158120 A1 | 10/2002 | Zierolf |
| 2003/0006762 A1 | 1/2003 | Clements |
| 2003/0007473 A1 | 1/2003 | Strong et al. |
| 2003/0025604 A1 | 2/2003 | Freeman |
| 2003/0031819 A1 | 2/2003 | Adams et al. |
| 2003/0046083 A1 | 3/2003 | Devinney et al. |
| 2003/0076230 A1 | 4/2003 | Runyon et al. |
| 2003/0083964 A1 | 5/2003 | Horwitz et al. |
| 2003/0093334 A1 | 5/2003 | Barzilay |
| 2003/0111540 A1 | 6/2003 | Hartmann |
| 2003/0141366 A1 | 7/2003 | Hartmann |
| 2003/0142691 A1 | 7/2003 | Hartmann |
| 2003/0142741 A1 | 7/2003 | Hartmann |
| 2003/0142742 A1 | 7/2003 | Hartmann |
| 2003/0145036 A1 | 7/2003 | Hartmann et al. |
| 2003/0179072 A1 | 9/2003 | Hartmann |
| 2003/0179077 A1 | 9/2003 | Hartmann et al. |
| 2003/0179093 A1 | 9/2003 | Hartmann et al. |
| 2003/0192557 A1 | 10/2003 | Krag et al. |
| 2003/0192722 A1 | 10/2003 | Ballard |
| 2003/0214389 A1 | 11/2003 | Arneson et al. |
| 2003/0220711 A1* | 11/2003 | Allen ............................ 700/215 |
| 2004/0031626 A1 | 2/2004 | Morris et al. |
| 2004/0046643 A1 | 3/2004 | Becker et al. |
| 2004/0046645 A1 | 3/2004 | Atkins et al. |
| 2004/0075361 A1 | 4/2004 | Hartmann |
| 2004/0075560 A1 | 4/2004 | Hartmann et al. |
| 2004/0085192 A1 | 5/2004 | Hartmann |
| 2004/0090868 A1 | 5/2004 | Endo et al. |
| 2004/0100376 A1 | 5/2004 | Lye et al. |
| 2004/0129279 A1 | 7/2004 | Fabian et al. |
| 2004/0138555 A1 | 7/2004 | Krag et al. |
| 2004/0142660 A1 | 7/2004 | Churan |
| 2004/0155651 A1 | 8/2004 | Britton |
| 2004/0174261 A1 | 9/2004 | Volpi et al. |
| 2004/0250819 A1 | 12/2004 | Blair et al. |
| 2005/0075985 A1 | 4/2005 | Cartmell |
| 2005/0088299 A1 | 4/2005 | Bandy et al. |
| 2005/0099292 A1* | 5/2005 | Sajkowsky ............... 340/539.13 |
| 2005/0116033 A1* | 6/2005 | Moore ........................ 235/385 |
| 2005/0128519 A1 | 6/2005 | Yamauchi |
| 2005/0201450 A1 | 9/2005 | Volpi et al. |
| 2005/0207617 A1 | 9/2005 | Sarnoff |
| 2005/0230110 A1 | 10/2005 | Ellison et al. |
| 2005/0240305 A1* | 10/2005 | Bogash et al. ................ 700/242 |
| 2005/0248456 A1 | 11/2005 | Britton, Jr. et al. |
| 2005/0282558 A1 | 12/2005 | Choi et al. |
| 2006/0006986 A1* | 1/2006 | Gravelle et al. ............. 340/10.3 |
| 2006/0017545 A1 | 1/2006 | Volpi et al. |
| 2006/0044137 A1 | 3/2006 | Morris et al. |
| 2006/0077036 A1 | 4/2006 | Roemerman et al. |
| 2006/0132351 A1 | 6/2006 | Le Sesne |
| 2006/0164212 A1 | 7/2006 | Roz et al. |
| 2006/0202827 A1 | 9/2006 | Volpi et al. |
| 2006/0241399 A1 | 10/2006 | Fabian |
| 2006/0265164 A1 | 11/2006 | Clark |
| 2007/0032224 A1 | 2/2007 | Boyer et al. |
| 2007/0035383 A1 | 2/2007 | Roemerman et al. |
| 2007/0210921 A1 | 9/2007 | Volpi et al. |
| 2007/0216526 A1 | 9/2007 | Volpi et al. |
| 2008/0018432 A1 | 1/2008 | Volpi et al. |
| 2008/0018450 A1 | 1/2008 | Volpi et al. |
| 2008/0018468 A1 | 1/2008 | Volpi et al. |
| 2008/0018469 A1 | 1/2008 | Volpi et al. |
| 2008/0024276 A1 | 1/2008 | Volpi et al. |
| 2008/0024277 A1 | 1/2008 | Volpi et al. |
| 2008/0024278 A1 | 1/2008 | Volpi et al. |
| 2009/0014520 A1 | 1/2009 | Kofman et al. |
| 2009/0040025 A1 | 2/2009 | Volpi et al. |
| 2009/0045917 A1 | 2/2009 | Volpi et al. |
| 2009/0219144 A1 | 9/2009 | Pettus |
| 2010/0317713 A1 | 12/2010 | Olson et al. |
| 2012/0133512 A1 | 5/2012 | Volpi et al. |
| 2012/0256730 A1 | 10/2012 | Scott et al. |

FOREIGN PATENT DOCUMENTS

| | | |
|---|---|---|
| EP | 0 948 940 A1 | 10/1999 |
| FR | 2 635 259 A1 | 2/1990 |
| WO | WO 96/04530 | 2/1996 |
| WO | WO 99/11086 A1 | 3/1999 |

OTHER PUBLICATIONS

U.S. Appl. No. 10/841,192, filed May 7, 2004, Roemerman, et al.
U.S. Appl. No. 10/997,617, filed Nov. 24, 2004, Tepera, et al.
"Automatic Identification—Radio Frequency Identification for Item Management," Part 6: Mode 3—Physical Layer, Anti Collision System and Protocols for Ultra High Frequency (UHF) Systems, Feb. 1, 2002, pp. 48-50, Reference Number of Document: ISO/IEC WD 18000-6 Mode 3, Committee Identification: ISO/IEC SC31/WG 4, Secretariat: ANSI.
Codd, E.F., "A Relational Model of Data for Large Shared Data Banks," Communications of the ACM, Jun. 1970, pp. 377-387, vol. 13, No. 6, Association for Computing Machinery, New York, NY.

(56) References Cited

OTHER PUBLICATIONS

"EPC(TM) Radio-Frequency Identity Protocols Class-1 Generation-2 UHF RFID Protocol for Communications at 860 MHz-960 MHz," Version 1.0.9, Jan. 31, 2005, pp. 1-94, EPCglobal Inc.(TM), Lawrenceville, NJ.

"Technical Report: 860MHz-930MHz Class I Radio Frequency Identification Tag Radio Frequency & Logical Communication Interface Specification Candidate Recommendation," Version 1.0.1, Nov. 14, 2002, pp. 1-17, Auto-ID Center, Massachusetts Institute of Technology, Cambridge, MA.

Wald, H., et al., "Making Health Care Safer: A Critical Analysis of Patient Safety Practices," Evidence Report/Technology Assessment No. 43, Jul. 20, 2001, Ch. 43, pp. 487-499, University of California at San Francisco (UCSF)—Stanford University, San Francisco, CA.

"Whitepaper: EPCglobal Class 1 Gen 2 RFID Specification," 2005 (approved Dec. 2004), pp. 1-7, http://www.alientechnology.com/docs/AT_wp_EPCGlobal_WEB.pdf, Alien Technology Corporation, Morgan Hill, CA.

* cited by examiner

INTERROGATION SYSTEM EMPLOYING PRIOR KNOWLEDGE ABOUT AN OBJECT TO DISCERN AN IDENTITY THEREOF

This application is a continuation of patent application Ser. No. 11/238,225, entitled "Interrogation System Employing Prior Knowledge About An Object To Discern An Identity Thereof," filed on Sep. 29, 2005, now U.S. Pat. No. 7,501,948, which application is incorporated herein by reference.

TECHNICAL FIELD

The present invention is directed, in general, to communication systems and, more specifically, to an interrogation system employing prior knowledge about an object to discern an identity thereof and methods of operating the same.

BACKGROUND

Present state of the art transponders, though performing a valuable operation, still often suffer from a condition of not having the responses reliably detected. The reasons for lack of reliable detectable responses are due to a number of factors such as attenuation and corruption of the signal due to various materials absorbing, reflecting, or scattering the signal, as well as noise and interference due to other radio frequency energy sources, noise and interference due to a plurality of radio frequency signals, and other problems familiar to those skilled in the art. As a result, a number of process steps, which might otherwise be automated, still employ manual and costly additional process steps to fully obtain the desirable information. An example is the process of receiving goods at a warehouse. A quantity of goods, each with radio frequency identification ("RFID") transponders or tags affixed thereto is stacked on a pallet. Additionally, an RFID tag is also affixed to the pallet. The pallet is then moved through a doorway surrounded by antennas. The antennas are the apertures for sending an interrogation signal to the RFID tags, as well as the apertures for receiving a reply. The radio frequency characteristics of the goods, such as the dielectric characteristics of the product and packaging, may often obstruct the signal path such that items within the interior of the stack are not detected. Thus, an accurate inventory count requires manual removal of all goods from the pallet requiring additional personnel and time. This amounts to hundreds of thousands of dollars per year in lost productivity for each such doorway or portal.

Many fields of commerce involve the need for counting, tracking, or accounting for items. In general, two of the lowest cost approaches presently in use involve bar code scanning or RFID techniques. Bar code scanning in general requires a clear optical path between an interrogator and the bar code while RFID techniques, which is a varied collection of technical approaches for many applications, in general does not. As with bar code scanning, the RFID techniques are primarily used for automatic data capture, and have the potential to significantly alter how processes occur and how companies operate. Bar code scanning alone, primarily because of the requirement of a clear optical path as well as limited information transfer capacity, is generally not compatible with many automated processes, such as the example of receiving goods previously cited.

One familiar application of RFID techniques, highly visible to travelers and consumers, is "smart labels" seen in airline baggage tracking, and in many stores for inventory control and for deterrence of theft. In some cases, the smart labels may combine both RFID and bar coding techniques.

The RFID tags are in general very versatile and can be adapted for many and diverse applications. The RFID tags can be configured with or without batteries; and can be read only or read/write. The RFID tags can also be configured to operate over various ranges of separation between the interrogator and the tag. Less familiar, but very common applications include the inclusion of RFID tags into automobile key fobs as anti-theft devices, into identification badges for employees, and RFID tags incorporated into wrist bands as an accurate and secure method of identifying and tracking hospital patients, prison inmates, and patrons at entertainment and recreation facilities.

Typically, the RFID tags without batteries (i.e., passive RFID tags) are smaller, lighter and less expensive than those that are active RFID tags (i.e., powered RFID tags). The passive RFID tags are maintenance free and have lifetimes that are generally very long when compared to the requirements of their specific application. Additionally, considering all RFID tags, costs can range from less than 50 cents to more than $150.00 depending upon features and functionality. The powered backscatter RFID tags, also often referred to as semi-active RFID tags, represent a middle ground between passive RFID tags and active RFID tags. An example of such powered backscatter RFID tags is a PowerID Read Only 2000 tag by Power Paper Ltd. of Burr Ridge, Ill.

Even less complex RFID tags can be encoded with 64 or more bits of data that represent a large number of unique identification numbers. A 64-bit RFID tag can provide up to 18,446,744,073,709,551,616 unique identification numbers. An important attribute of some RFID systems is that a number of RFID tags can be interrogated simultaneously. This is a result of the signal processing associated with the technique of impressing the identification information on a carrier signal.

One attribute of RFID tags that is counter-intuitive is the ability of the unpowered, less complex RFID tags to support interrogation of multiple RFID tags at the same time. Using anti-collision techniques, the practical limit of simultaneous interrogations can be quite large. Using an anti-collision algorithm, multiple RFID tags can be readily identified, and even at the extreme reading range, the RFID tags require only minimal separation (e.g., five centimeters or less) to prevent mutual de-tuning. Most other identification systems such as bar code scanning require that only one device be interrogated at a time. The ability to deal with a plurality of devices simultaneously, and the ability to have them very closely spaced, and not physically viewable are desirable attributes for applications requiring rapid interrogation of a large number of items. In theory, it is one of the most useful attributes of RFID systems.

For example, a pallet of packaged consumer goods typically contains about 64 cubic feet of product cartons. Within this volume, it is not uncommon to have more than 100 cartons of product. A retailer may require that each carton, and the pallet which carries the stack of cartons, have an RFID tag affixed thereto. More than 100 other RFID tags, all of which are closer to the interrogator, may surround the innermost RFID tag in this instance. Thus, dealing with a plurality of devices simultaneously, and being able to have them very closely spaced are desirable attributes for applications requiring rapid interrogation of a large number of items. Unfortunately, conventional reader techniques will often make the reliability of interrogations of the innermost RFID tags described above less than acceptable.

One of the most powerful methods in the prior art is to combine one or more techniques for communicating with a plurality of RFID devices simultaneously. One such example is the use of anti-collision techniques and the "persistent sleep" function as described by the Electronic Product Code ("EPC") and, more specifically, EPCglobal release EPC Specification for Class 1 Gen 2 RFID Specification, December 2004, and "Whitepaper: EPCglobal Class 1 Gen 2 RFID Specification," published by Alien Technology Corporation, Morgan Hill, Calif. (2005), both of which are incorporated herein by reference. Anti-collision features allow an interrogator to increase the number of RFID tags it can observe. Having observed the RFID tags, the interrogator can command the RFID tags, which have been reliably read, to "sleep" so they will not respond to subsequent interrogations. The system then interrogates again, and is able to communicate with the RFID tags which were not observed in the first sequence. Though not truly simultaneous, the persistent sleep function of the EPC RFID tags permits a rapid and nearly simultaneous interrogation operation to be performed so long as the interrogator can reliably read the RFID tag.

In theory, it would seem that existing techniques would allow interrogation of an almost infinite number of RFID tags simultaneously, or nearly simultaneously. A number of practical issues, however, limit the theory of limitless numbers of simultaneous interrogations. For example, even with the frequency hopping commonly employed and using a conventional receiver, it is not possible to effectively filter the plurality of responses into individual signals or individual channels. As a result, an attempt to detect the response of any individual RFID tag in the presence of many other responses is often limited by interference. The effective signal-to-noise ratio at the interrogator is reduced when there is a plurality of responses, such that any individual response is less likely to be properly detected. The degree of signal-to-noise ratio degradation is dependent on a number of factors. While techniques such as persistent sleep can mitigate this problem, they do not sufficiently address the signal-to-noise problem to reliably receive information from the RFID tag in difficult environments. If a sufficient number of RFID tags are all closely grouped so that the effective signal-to-noise ratio is substantially reduced and, therefore, interfering with each other, reliable reading will be very difficult and, even if possible, will take a substantially longer amount of time than if these conditions were not present.

In the case of active or powered RFID tags, additional problems can arise. In particular, the longer reading ranges associated with these RFID tags can allow a very large number of RFID tags to respond at the same time, because the number of possible RFID tags is roughly proportional to the square (or even cube) of the interrogation range. Also, in the case of powered RFID tags, power management and avoidance of mutual interference has long been a topic familiar to those skilled in the art, as well as the subject of a number of Federal Communications Commission ("FCC") actions.

The attributes of conventional systems, capable of interrogating RFID tags and also capable of interpreting the RFID tag responses are familiar to those skilled in the art. Each interrogator antenna is connected to radio frequency and digital circuits, which include a "reader" capable of detecting the presence of an RFID tag. An example of such an interrogator is a Series 2000 reader from Texas Instruments of Dallas, Tex., which provides the radio frequency and control functions necessary to communicate with 134.2 kilohertz, half-duplex, frequency-shift keying tags. The Series 2000 reader sends an energizing signal to the RFID tag. The RFID tag modulates the radio frequency energy impinging thereon, the backscatter of which is received and decoded by the reader. The Series 2000 reader then transmits a digital representation thereof via a standard serial interface (e.g., RS232 or RS422/485).

Taken together, an interrogator antenna, and reader and control circuitry form an interrogator, with a digital interface capable of transferring data to a digital computer, or to a communication network. The reader circuitry does not have to be close to the antennas, and can be separated by well over 100 meters if necessary. Thus, it is not necessary to operate the reader circuitry within the same physical volume as the items being interrogated. This provides the opportunity for placing antennas and, depending on the frequency, minimal support equipment (e.g., amplifiers and/or A/D converters) near items being interrogated, even if that environment is hostile to the operation of ordinary electronic equipment. The use of autocorrelation techniques, multiple port interrogators, separation of sensitive portions of the interrogation system from harsh environments and anti-collision techniques, can provide marked improvements over conventional RFID reader technology.

Some of the aforementioned interrogation techniques, however, whether used alone or used in some combination of techniques, have limitations. For example, multiple port receivers may introduce more signal interference than would otherwise be encountered by a single aperture system. This can occur when interrogation from a diversity of directions elicits more RFID tag responses than would have been generated by a single aperture. If only one viable signal path between the RFID tag and the interrogator exists, then these extra responses generally mean an effective increase in total noise/interference, without any improvement in signal power. At some point, the number of RFID tags responding can create a noise/interference environment that, without matched filtering such as autocorrelation, will cause a failure of the RFID tag's signal to be detected. The autocorrelation systems, however, generally need prior knowledge that heretofore has not been available in a timely fashion. Alternatively, algorithms that successively turn the RFID tags off (as in "persistent sleep") can solve some portion of the collision problem, but also can substantially increase the time for reliable queries and responses. Timeliness of signal processing is important, since interrogators are usually installed at discreet locations such as loading doors or along conveyor systems. The opportunity to perform an interrogation and receive a fully compliant response may be a period of less than a second.

It is important to note that true instantaneous reading of an RFID tag is rarely a necessity. The conventional systems, however, typically use the real time paradigms of the bar code scanning techniques. In other words, in the same manner as a bar code that is only read and processed at the precise time that the bar code is being scanned, conventional RFID systems do not employ a memory of prior reads. This failure to learn from history is a serious drawback in conventional systems.

The RFID tags may be compatible with a number of harsh environments. One firm using RFID tags, Pierrel-Ospedali, an Italian pharmaceutical company, employs a manufacturing process that requires products to be sterilized for a period of time at over 120 degrees Celsius. Products enter an autoclave mounted on steel racks. Other examples of RFID tags withstanding harsh environments can be seen in the use of such devices for veterinary and animal husbandry purposes. The RFID tags are used to identify millions of livestock animals around the world. These systems track meat and dairy animals, valuable breeding stock and laboratory animals. The RFID tags may be hermetically sealed, and operate over the life of the animal. Body fluids, temperature, mechanical shock, normal electromagnetic interference and radiation such as x-rays should not affect the programmed code within the RFID tag. It is expected that the RFID tags will not only survive these environments; they will operate properly in such environments. Although the RFID tags may be capable of operating in this hostile environment, the inherent signal processing limitations associated with conventional receivers, common to RFID systems, is such that these hostile environments often degrade signal-to-noise and signal-to-interference ratios to such an extent that the interrogator cannot reliably detect or decode the response from the RFID tag.

Accordingly, what is needed in the art is an interrogation system and related method to identify and account for all types of items regardless of the environment or application that overcomes the deficiencies of the prior art. The interrogation system should be capable of counting hundreds or thousands of RFID tagged items quickly and reliably while in a confined space (e.g., casino chips in situ within a chip carrier). As another example, it should provide a system that can inventory the contents of a pallet or tote containing a large number of items, without unpacking. The interrogation system should also be capable of addressing a large number of powered backscatter RFID tags or active RFID tags without encountering severe signal-to-noise or signal-to-interference ratio problems. The signal processing of an interrogator should increase the overall effectiveness of a query and response cycle by noting that interesting and useful patterns can be inferred by sampling minimal data. Then, once the existence of the pattern is established, additional signal processing can be deployed to drive a sequence to a successful completion. As a result, the patterns described above can be employed to obtain useful information.

Additionally, what is needed in the art is an interrogation system that can derive information by a combination of current observables and prior observables that increase the automatic features of the interrogation system for material handling, and reduce the number of incidents involving manual unpacking of carriers such as pallets, crates, bins, and totes, while accounting for a plurality of items simultaneously. The interrogation system should support robust operation under conditions, and in environments that would otherwise be hostile. In accordance therewith, the interrogation system should accommodate a wide variety of signal noise and signal interference conditions, a wide variety of material handing procedures, and provide for a class of pseudorandom noise codes with characteristics desirable for both data processing and signal processing.

SUMMARY OF THE INVENTION

These and other problems are generally solved or circumvented, and technical advantages are generally achieved, by advantageous embodiments of the present invention which includes an interrogation system employable with an object having a radio frequency identification (RFID) tag and method of operating the same. In one embodiment, the interrogation system includes a database having prior knowledge about the object, and an interrogator that scans the RFID tag and discerns additional information therefrom about the object. The interrogator still further includes a control system that identifies the object based on the prior knowledge and the additional information.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. The present invention will be described with respect to exemplary embodiments in a specific context, namely, interrogation systems and methods of operating the same.

To achieve the foregoing and other objectives of and in accordance with the purposes of the invention, as embodied and broadly described herein, the present invention includes an interrogator, operating as a querying system, and corresponding transponder embodied in an RFID tag that responds to the query. The interrogation system includes computers to store and manipulate information from the interrogator and mounting techniques to incorporate or otherwise affix the RFID tags to various items. The RFID tag(s) allow items with RFID tag(s) to be identified and counted. Since many procedures are dependent on having the right items available and upon knowledge of matters such as inventory levels, the interrogation system provides a significant benefit to those who manage processes such as logistics, warehouse management and other diverse processes.

Figure 1:
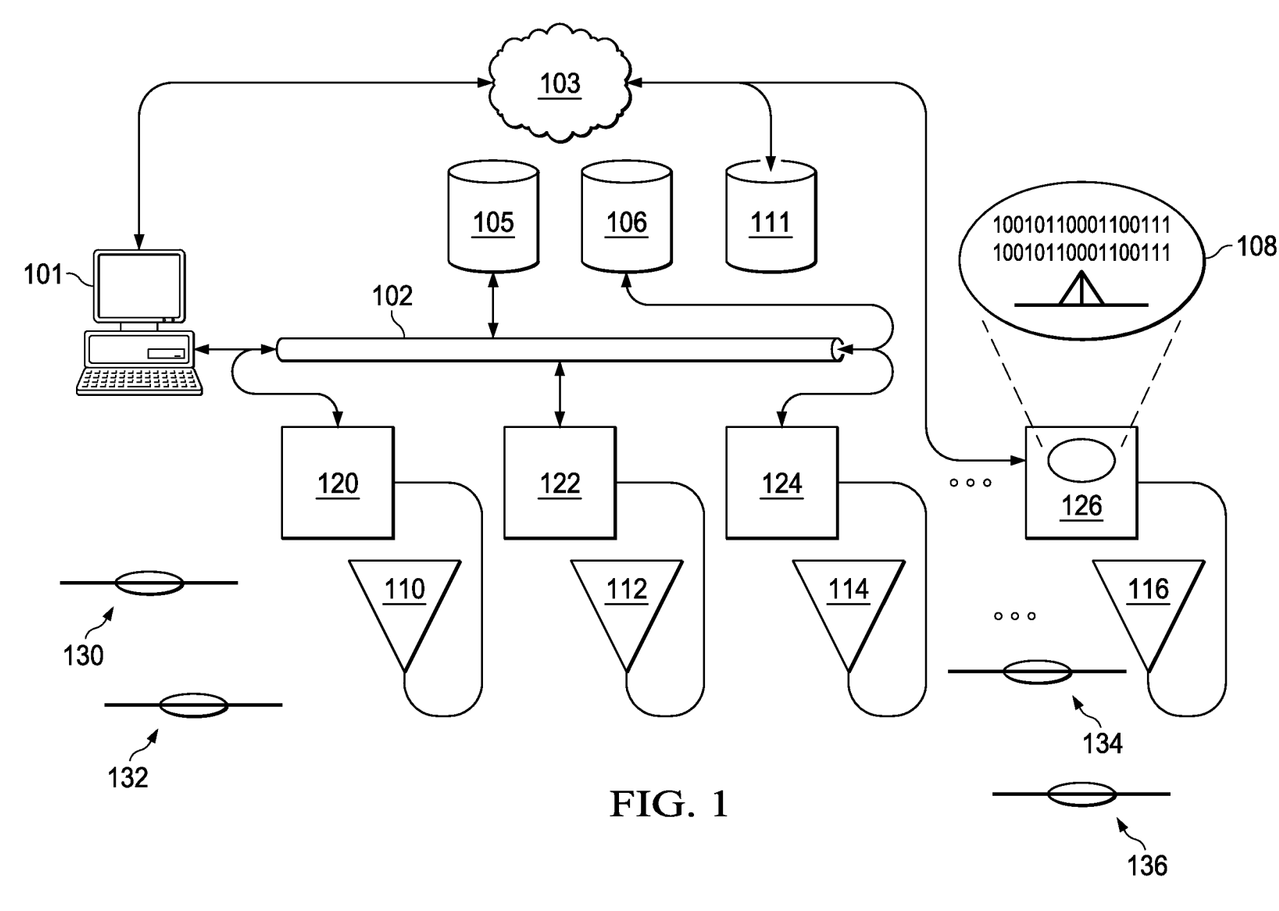
FIG. 1 illustrates a system level diagram of an embodiment of an interrogation system constructed according to the principles of the present invention.

Referring initially to FIG. 1, illustrated is a system level diagram of an embodiment of an interrogation system constructed according to the principles of the present invention. The interrogation system includes a control system (e.g., computer 101) coupled to a plurality of interrogators 120, 122, 124, 126 by means of a digital connection such as a local area network 102. While the interrogation system illustrates four interrogators, the principles of this invention are applicable with any number thereof. The computer 101 and the interrogators 120, 122, 124, 126 interact with a local database 105 of RFID tag codes, which are used both for autocorrelation processing, and for item identification. The interrogators 120, 122, 124, 126 each incorporate one or more autocorrelators 108, with autocorrelation processes shown as an autocorrelation triangle. The interrogators 120, 122, 124, 126 are connected to at least one antenna 110, 112, 114, 116. The antenna(s) 110, 112, 114, 116 provide a mechanism for sending and receiving radio frequency emissions to and from RFID tags 130, 132, 134, 136. For simplicity and clarity of illustration, four tags are shown in the interrogation system. Those skilled in the art understand, however, that the interrogation system may be employed with any number of RFID tags 130, 132, 134, 136. Additionally and for purposes of simplicity, when referring to an RFID tag or multiple RFID tags, all reference numerals are often provided thereafter. The same principle applies to other components, subsystems, etc. described with respect to the illustrations herein.

The computer 101 can also send records, via the Internet 103 or local area network 102, whether installed with wires, fiber, or wirelessly, to a data archives database 106. The database 106 can be used not only for inventory counts and for enterprise purposes (e.g., warehouse management), but also for statistical research and post processing, which can then be used to devise more productive use of the assets. As described below, this historical data can also be used for signal processing purposes. The interrogation system employs the database (e.g., the local database 105) having prior knowledge about an object with an RFID tag 130, 132, 134, 136. The interrogator(s) 120, 122, 124, 126 scan the RFID tag 130, 132, 134, 136 and discern additional information therefrom about the object. The control system (e.g., the computer 101) identifies the object based on the prior knowledge and the additional information.

In an exemplary embodiment, each interrogator 120, 122, 124, 126 uses the data sequences obtained from observable RFID tags 130, 132, 134, 136 to infer future data sequences likely to be present in other RFID tags 130, 132, 134, 136. The inference is based on the knowledge of the data fields within an RFID tag 130, 132, 134, 136. In most cases, it is practical to determine at least some of the digital sequence in at least one more subsequent RFID tags 130, 132, 134, 136, once a first RFID tag 130, 132, 134, 136 has been decoded. For exemplary RFID tags, see U.S. Patent Application Publication No. 2006/0017545, entitled "Radio Frequency Identification Interrogation Systems and Methods of Operating the Same," to Volpi, et al., published Jan. 26, 2006, which is incorporated by reference.

For an example of a passive RFID tag, see U.S. Pat. No. 6,859,190 entitled "RFID Tag with a Quadrupler or N-Tupler Circuit for Efficient RF to DC Conversion," to Pillai, et al., issued on Feb. 22, 2005, and U.S. Pat. No. 6,618,024 entitled "Holographic Label with a Radio Frequency Transponder," to Adair, et al., issued Sep. 9, 2003, which are incorporated herein by reference. Of course, other types of RFID tags including surface acoustic wave identification tags such as disclosed in U.S. Patent Application Publication No. 2003/0111540 entitled "Surface Acoustic Wave Identification Tag having Enhanced Data Content and Methods of Operation and Manufacture Thereof," to Hartmann, filed Dec. 18, 2001, which is incorporated herein by reference, may be employed in conjunction with the principles of the present invention. For more information, see "RFID Handbook," by Klaus Finkenzeller, published by John Wiley & Sons, Ltd., $2^{nd}$ edition (2003), which is incorporated herein by reference. Most of the teachings disclosed herein employ passive RFID tags to illustrate the principles presented. However, these techniques can be effectively applied to any type of interrogation system including the use of active RFID and powered backscatter RFID tags.

Though the RFID tag standards were not developed for the purpose of predicting codes and applying autocorrelation techniques to improve interrogation quality, systems and methods to establish such digital sequences for use in autocorrelation processes are advantageous. For example, EPC RFID tag data standards define completely that portion of the EPC RFID tag data that is standardized. In particular, these standards define how data is encoded on an EPC compliant RFID tag. In addition, these standards also define how RFID tag data is encoded for use in the information systems layers of the EPC systems network. In a similar fashion, there are plans for a unique identifier (UID) that will be introduced by the U.S. Department of Defense and its suppliers. For a better understanding of RFID tags in compliance with the EPC, see "Technical Report 860 MHz-930 MHz Class I Radio Frequency Identification Tag Radio Frequency & Logical Communication Interface Specification Candidate Recommendation," Version 1.0.1, November 2002, promulgated by the Auto-ID Center, Massachusetts Institute of Technology, 77 Massachusetts Avenue, Bldg 3-449, Cambridge Mass. 02139-4307, which is incorporated herein by reference. This use of standard, fielded data is common to conventional RFID systems including very sophisticated, active radio transponding systems such as those provided by Savi Technology, of Sunnyvale, Calif. (for example, see the SaviTag ST-602), and less complex backscatter RFID tags including the EPC standards for RFID tags.

Within these standards are defined a variety of data fields, many of which can be defined deterministically. One example is a serialized global trade identification number, which is an identity type, based on the EAN.UCC global trade identification number ("GTIN") defined in the general EAN.UCC specifications, promulgated by EAN.UCC, which are incorporated herein by reference. A GTIN by itself does not fit the definition of an EPC pure identity, because it does not uniquely identify a single physical object. Instead, a GTIN identifies a particular class of object, such as a particular kind of product or stock keeping unit ("SKU"). In a similar fashion, the U.S. Department of Defense specifications will define data fields, which do not uniquely identify a single physical object.

Figure 2:
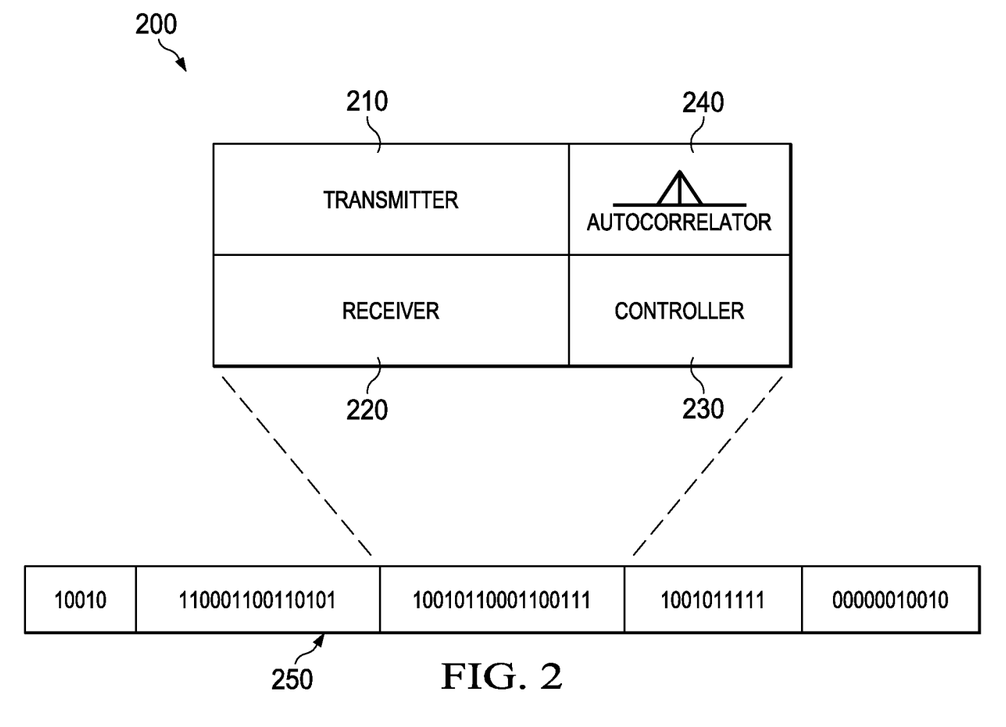
FIG. 2 illustrates a diagram representing an embodiment of an interrogator constructed according to the principles of the present invention.

Turning now to FIG. 2, illustrated is a diagram representing an embodiment of an interrogator 200 constructed according to the principles of the present invention. The interrogator 200 includes a transmitter 210, a receiver 220, a controller 230 and an autocorrelator 240. The interrogator 200 energizes an RFID tag and then receives the encoded radio frequency (RF) energy (reflected or transmitted) therefrom, which is detected and decoded by the receiver 220. The controller 230 provides overall control of the interrogator as well as providing reporting functions. Additionally, the interrogator 200 typically includes a data input/output port, keyboard, display, power conditioner, power source, battery, antennas, and housing. An example of an interrogator is provided in U.S. Patent Application Publication No. 2004/0174261 entitled "Interrogator and Interrogation System Employing the Same," to Volpi, et al., filed Mar. 3, 2003, and U.S. Patent Application Publication No. 2005/0201450, entitled "Interrogator And Interrogation System Employing The Same," to Volpi, et al., published Sep. 15, 2005, which are incorporated herein by reference. Additionally, while the database(s) and control system are separate systems within the interrogation system illustrated and described with respect to FIG. 1, those skilled in the art should understand that the aforementioned systems can be integrated into the interrogator to form an integrated, interrogation system (e.g., a portable integrated, interrogation system).

In the illustrated embodiment, the autocorrelator 240 identifies a standard data field 250 with a resultant signal processing gain resulting in increased interrogator 200 sensitivity as illustrated by an autocorrelation triangle. In many applications including supply chain management, logistics management, and inventory control, there typically exists a portion of the data within a response from an RFID tag that is non-unique data. That is, given that its existence is established within one RFID tag, the probability that this same data sequence will also exist in other RFID tags at this same time and place is likely. In addition, there may be a very high correlation between the responses from various RFID tags affixed to items loaded on or in carriers such as bins and pallets. Examples of correlations include the observation that goods from the same manufacturer will tend to have same manufacturer's code, and goods of the same type will tend to have the same GTIN. Such correlations exist within all of the standards. Moreover, many of the standards apply primarily at one frequency, or a few frequencies. It is this repetition of a portion of the RFID tag data being common to many RFID tags that forms the basis of very valuable information. It is possible to autocorrelate on just this portion of the data sequence and thereby obtain signal processing gain to enhance the detectability of an RFID tag with such a same sequence. Once that portion of the RFID tag has been decoded and the existence firmly established, then other techniques including non-coherent and coherent integration across multiple RFID tag queries as well as anti-jitter techniques can be used to enhance and therefore reliably detect the unique portions of a particular data sequence thereof.

Figure 3:
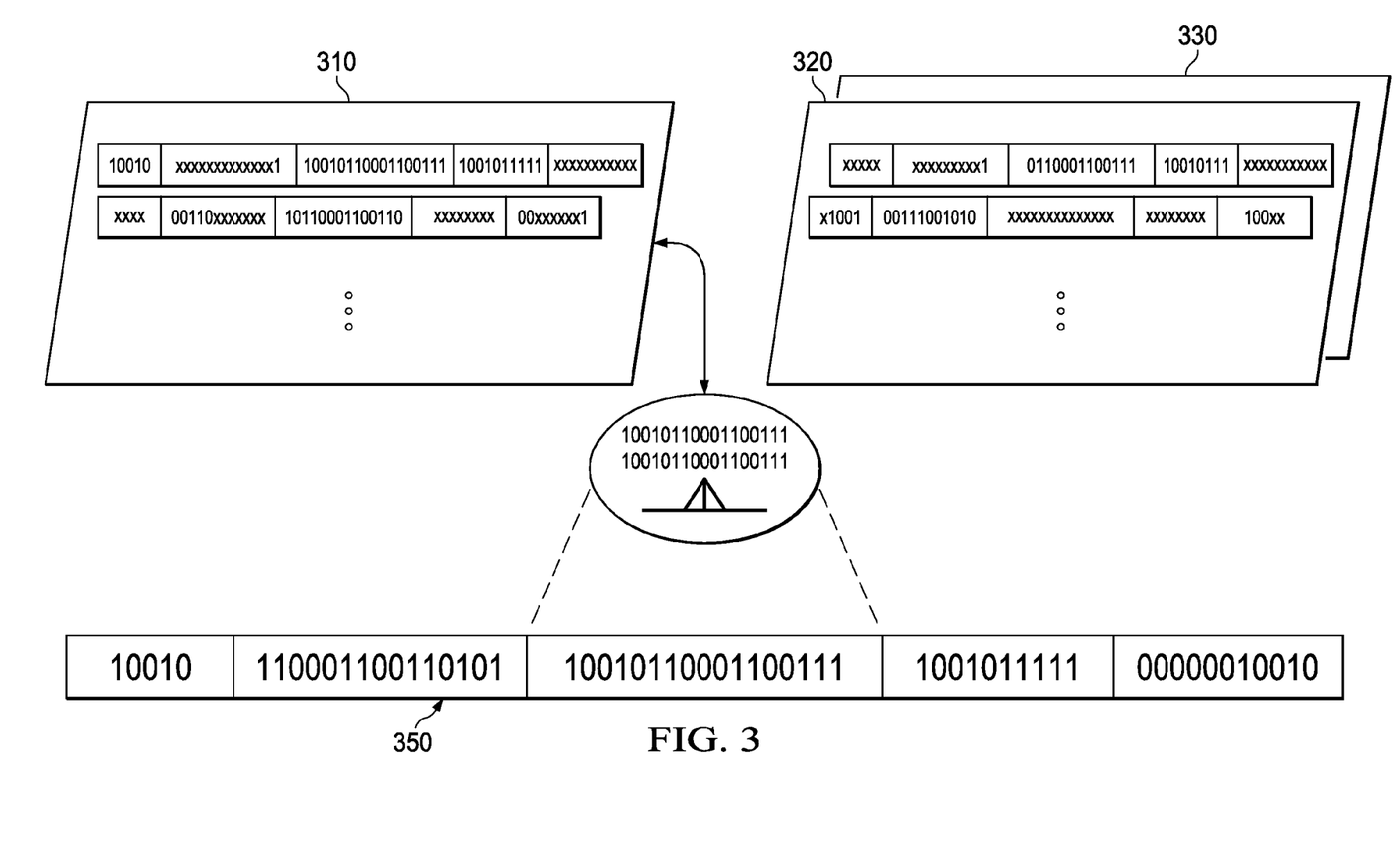
FIG. 3 illustrates a diagram representing an embodiment of an autocorrelator within a multi-protocol system employable in an interrogator constructed according to the principles of the present invention.

Turning now to FIG. 3, illustrated is a diagram representing an embodiment of an autocorrelator within a multi-protocol system employable in an interrogator constructed according to the principles of the present invention. A database 310 provides a data field 350 characteristics based on a number of standards. In addition, some of the data within a field is previously known and is used both to identify which standard is being used, and may also be used for the autocorrelator.

When the data contents of an RFID tag are detected, the prior knowledge may be used to increase the probability of detecting other RFID tags. For example, the manufacturer's identification data can be used as a chipping sequence for the autocorrelator, thereby increasing the probability that other RFID tags from the same firm can be read. Another example would be to use the GTIN to find RFID tags affixed to goods of the same type. There is a high probability that similar goods, for example, pharmaceutical goods, will be handled together on the same pallet or within the same tote. There is also a high probability that goods from the same production source will be on the same pallet or within the same tote.

In other words, a pallet of goods on which a few RFID tags have been read, indicating they are affixed to Kraft cheese products (as an example) suggests that focusing on goods from Kraft (using that manufacturer's identification data), and also looking for cheese (using that product type) is likely to find additional RFID tags, if they have not yet been detected. The aforementioned is clearly much more powerful than expecting to find rat poison on the same pallet as food for human consumption. The control system, therefore, can identify whether an object belongs with one or more accompanying objects having respective RFID tags. In the above example, the control system determines if the existence of the cheese satisfies a complete order. Alternatively, the existence of, for instance, rat poison would be a measure of appropriateness (or in this case a lack thereof) of the object with the RFID tag.

Note that the prior knowledge of the data content used for autocorrelation could have been obtained from the database 310, or from a response from an RFID tag recently interrogated, such as an RFID tag within the same carrier. Of course, additional databases 320, 330 also exist and may be used for additional insight. Additional data characteristics that the additional databases 320, 330 can provide include RFID tags operating at other carrier frequencies. Since there is a high degree of correlation between carrier frequency and RFID tag standards, there is little need to test for all possible combinations of data field standards and operating frequencies.

The ability to detect the signal of an RFID tag on an item loaded on or in such carriers, even when conditions include the presence of multiple responses, high noise, high interference levels and generally poor signal conditions, is very desirable. As previously stated, such an ability can help prevent the necessity for expensive and time consuming material handling and manual labor. Autocorrelation methods are a mechanism to improve detection and take advantage of the fact that the probability that the data loaded on the RFID tags of items grouped in or on a carrier have some predictable characteristics and are in general sufficiently non-zero to be of substantial value.

Among the desirable characteristics is the fact that goods of a similar type are likely to have identical or related GTINs. Items from the same manufacturer will have identical or related company prefix codes. This is but one illustration and those skilled in the art will recognize that among the various schemes and standards for defining the data content of an RFID tag, a number of similar definitions exist and are compatible with the principles described herein.

The databases, interrogation processes (including the autocorrelation processes) and control systems and processes described herein provide a mechanism for determining or estimating much of the data content of related RFID tags affixed to a collection of items. Within many definitions, the number of bits that are not unique is larger than the number of bits that are unique. In addition, even those fields that are unique, such as serial numbers, are often dominated by identical data, which in turn generates highly predictable bit patterns. As an illustration, consider consecutive serial numbers or like date codes.

With reference to FIG. 1, the use of a plurality of correlators 108 within each interrogator 120, 122, 124, 126 permits rapid searching across a broad autocorrelation space represented by multiple dimensions of uncertainty, such as data content uncertainty, timing uncertainty, and other dimensions. Those familiar with the art of autocorrelation systems operating in the presence of a plurality of signals will recognize the desirability of a multiple dimension approach.

In another embodiment, each interrogator 120, 122, 124, 126 uses the data sequences in observable RFID tags 130, 132, 134, 136 to infer data sequences likely to be present in other RFID tags 130, 132, 134, 136 as described above, but in addition to use of the relationships of data fields, the interrogator 120, 122, 124, 126 uses observed patterns from previous interrogations. For example, a database of prior observations can be constructed using relational techniques, or object oriented techniques. In a given situation, an interrogator 120, 122, 124, 126 may see only RFID tags 130, 132, 134, 136 associated with a small number of distinct classes of object, and may only see RFID tags 130, 132, 134, 136 associated with a small number of manufacturers. As a result, the interrogator 120, 122, 124, 126 can build a history of relationships among RFID tag observations, and can improve the probability of correctly selecting a data set for autocorrelation. This history of observations can be maintained within the memory of the interrogator 120, 122, 124, 126, or in an external database 106. This history represents a history of prior movement of RFID tagged items, which is used to improve the likelihood of accurate reading and can also be used to detect the possibility of an incorrect sequence of reading.

In the prior example of detecting an incorrect reading, consider the instance where a pallet RFID tag 130, 132, 134, 136 is used as a cue to read the objects or items tagged and placed upon the pallet. If history shows that this particular combination of goods has always had 115 items on a pallet, the instance where 114 items are present may represent an error. There are only three possibilities: either for some reason 114 is correct in this instance, an RFID tag 130, 132, 134, 136 has not been read, or one of the 115 items is missing. By employing the system described herein, this anomaly can be detected without having to integrate the system into a warehouse management system (WMS), or other system that would have previously provided the information that 115 items were expected. Also, note that should such WMS data be available, then the integration of the prior knowledge and WMS databases further enhances the ability to gain complete and accurate information. As an example, consider the instance where the pallet RFID tag 130, 132, 134, 136 does not correspond to the pallet load as evidenced by other prior pallets that have arrived, but the pallet load does correspond to a known pattern of goods. This indicates the pallet RFID tag 130, 132, 134, 136 may have been affixed to the wrong pallet, which is a very useful thing to know as corrective measures can be quickly initiated at minimum cost to resolve any error. Similar examples are easily comprehended for totes loaded with collectable items (e.g., coins, ephemera), or for other high value goods such as parcels of gems, or casino chips.

Returning to the Kraft example, some anomalous patterns represent business process failures. For example, having a cheese product that requires refrigeration in a facility without climate control would be an error. Detecting such a product's RFID signature would be out of the norm as learned from historical interaction with such material. Similarly, detecting rat poison's RIFD signature within the pallet of goods intended for human consumption might likely represent a business process failure and, if so, would be unusual and, therefore, would be out of the norm as also learned from historical interactions. This historical learning of what is and what is not acceptable by such a system means that the system would get "better" as the system experiences more activities. Also, the external database 106 may also share and exchange such historical data with other databases and facilities. This cooperation and interaction can substantially increase the amount of historical data available and, in so doing, also the quality of predicting what is present, what should be present, and what might be a problem.

An additional feature of the system described herein is to store a digitized sequence of baseband information from an interrogator receiver, and to do recursive signal processing on such data. In other words, the data shown in FIG. 3 can be derived from prior observations of other RFID tagged objects, from prior knowledge of the data structure and field standards and from observations of the current set of objects being interrogated. For example, if a GTIN has been detected, the GTIN can be used as a chipping sequence for autocorrelation purposes and can, therefore, be used to detect RFID tags that might otherwise be impossible to find. As more and more information is read, successive passes through the stored baseband data permits still more information to be read. This approach allows using newly observed information to, in turn, be used to construct more refined signal processing and thereby recover still more information from the stored baseband sequences.

Post processing of stored data addresses a number of systems issues including real time material movements, limiting the number of active interrogation transmissions and improving signal to noise and signal to interference performance. Inasmuch as many items with RFID tags are moved by automatic material handling systems, a group of RFID tags associated with a pallet or case of goods may be within read range for less than a second. Thus, the ability to do post processing supports the material movement processes for many systems.

An example of such a post processing would be to isolate a data sequence from an RFID tag(s) with a good signal-to-noise ratio and then to do post processing using the data sequence as the basis for autocorrelation. Other examples of post processing techniques, in addition to those already described, include Doppler bins, power bins, polarization bins, multiple autocorrelation techniques (e.g., using both a fragment of the digital signal with the best orthogonal characteristics and separately the longest known digital sequence), and clocking speed difference among RFID tags. A number of such post processing techniques exist and those familiar with the art will recognize these are just a few examples. These various techniques can be used simultaneously to construct multidimensional matched filters as well.

An example wherein post processing is based on the data sequences read from RFID tags with good signal-to-noise ratio is hereinafter provided. Other RFID tags, whose signals had poor signal-to-noise ratios will be detected in post processing due to the additional signal processing gain from autocorrelation techniques. In turn, most (or all) of the newly detected RFID tags will have a temporal characteristic slightly different from each other. This timing difference is caused by a plurality of effects including RFID tag to RFID tag variation, blockage unique to the RFID tag, antenna variation, antenna orientation, multipath, and other factors known to those skilled in the art. A second post processing technique can be accomplished by adding an estimate of the temporal variance for each of the RFID tags, creating a two dimensional matched filter, with one dimension being based on auto correlation, and a second matched filter being based on temporal displacement. While providing a single example, those skilled in the art will readily see that a number of such post processing methods can be used and fall within the broad scope of the present invention. Further, the aforementioned approach addresses a number of system issues including the very challenging problem of obtaining a balanced link between the interrogator and a plurality of RFID tags, which vary widely in their characteristics. It is also contemplated that a sequence of multiple passes (e.g., at least two) of post processing techniques is performed to adaptively add signal processing gain to establish a balanced link between each of the RFID tags in a group with a very wide variance in links. The merit of various processing methods varies with the circumstances and, in a multiple product facility, a preferable set of approaches may vary from pallet to pallet. Thus, the ability to adaptively select processing methods, without the constraint of real time material movement is a significant benefit from a signal processing perspective.

Another embodiment of such a real time selection of processing strategy is to consider a material handling facility that receives packaged goods with a wide range of cases per pallet.

The techniques that address a pallet of dry bulky items, with few cases per pallet (for example, dry breakfast cereal) will likely differ from the techniques for dense metallic items with many small cases per pallet (for example ammunition). In the first case, the number of RFID tags is low, and the blockage by the case goods is low, representing a less stressful circumstance than the second example wherein the number of RFID tags is higher, average tag spacing is denser, and blockage is higher. A two dimensional matched filter will often suffice for the low density case and little post processing will be needed. In the higher density case, three or more dimensions are likely, and post processing may continue even after the item is out of interrogation range. Returning again to the Kraft cheese illustration, it can be seen that prior search strategies, and prior signal processing strategies to construct multi-dimensional matched filters, provide two levels of learning that can be derived from prior observations as applied to signal processing, post processing, and related matters.

For the purposes of real time interaction with human operators and with automatic material handling algorithms, a significant period of time usually exists, in signal processing terms, before the human controller or the automatic machine controller is notified of a failure to read. Typically, an item in motion on a forklift, conveyor or other conveyance requires a finite time to decelerate an improperly read pallet or tote. This deceleration period typically occurs after the pallet or tote has exited the read range of the interrogation system. The time after exiting the reading zone, and prior to the decision to divert or decelerate the item, represents a significant opportunity for post processing, and is usually a few seconds. Modern processors with multiple correlators can conduct a very significant amount of processing in that time. Thus, a set of objects, which would have been flagged as misread by conventional readers, is much less likely to be misread and, therefore, less likely to require a disruption in material handling processes. This can be thought of as being analogous to effectively creating balanced links (e.g., in the sense of two way communication links) over a larger dynamic range of signal, in some cases in real time and in others after the fact. This combination of real time material movement, and the creation of a plurality of effectively balanced links from a single interrogation is a very desirable feature of the interrogation system described herein.

In another embodiment, an interrogation system and method generates a much lower duty cycle of transmission, thereby reducing the potential for interference among interrogators in a confined location. This is feasible because of the additional information available due to the learning achieved by the techniques and approaches previously stated. Typically, the interrogation initially occurs at the low transmission power levels until a response is detected. An example of this is the case of a pallet with multiple RFID tagged items, wherein only a subset of the RFID tags is capable of being detected by direct (i.e., conventional) methods. In this embodiment, the interrogator will transmit interrogation signals at a plurality of power levels from very low (e.g., minimum) to very high (e.g., maximum) as the pallet moves past the interrogator, providing spatial diversity among the observations. A priori knowledge that a diversity of power levels and spatial relationships have been used provides added information, along with autocorrelation techniques, and employing at least one of the other techniques herein discussed results in a very high probability that all observable RFID tags will be detected as a result of post processing (embodying a true systems approach to solving a difficult problem in a reliable "low-Q" manner). Further, as there is little chance that slowing the movement of the pallet would produce significantly more real time detections for any reasonable speeds that may be selected, the signal processing is therefore not a limiting factor in establishing material movements. Those skilled in the art will see that the range of commercially useful material movement speeds, compared with interrogation timelines, will generally allow for this approach. Thus, the interrogation system and related method can exploit the previously unavailable temporal freedom for both material movement and for the purposes of, among other things, signal processing.

Referring again to FIG. 1, in another embodiment the computer 101 manages a historical database of products and their associated RFID tags. Additionally, reading any RFID tag from a group can provide the information to infer other RFID tags likely to be present and the use of multiple correlators permits the rapid search through multiple dimensions of uncertainty. As previously described, each set of observations of associated RFID tags can be used to extend the history of observed patterns of associations. The observed patterns can be developed for a group of facilities, a single facility such as a distribution center, or for a subset of a facility such as a particular loading dock. Thus, the interrogation system can share learned data patterns from multiple locations. In conjunction herewith, typically the data field standards are provided to the system as un-learned prior knowledge and other knowledge such as data field content can be created by observations. Since it is highly likely that the RFID tags 130, 132, 134, 136 near a surface of a collection of RFID tags 130, 132, 134, 136 will have some of the same attributes as others associated with a single product carrier (pallet, tray or tote), the first use of the interrogation system is likely to provide a signal processing advantage, without the need for a large number of observations. After the first use, however, learned patterns provide additional advantages and these advantages may be shared by a plurality of interrogators and a plurality of locations.

In the case of mixed product pallets or totes, the aforementioned methodology can be very valuable. For example, if a facility routinely provides a standard setup of casino chips, pharmaceuticals, or some other mixed set of items, the interrogation system can automatically learn the various standard setups and can flag, as anomalous, a combination never seen before. Also, the interrogation system can use the prior observed patterns to manage the signal processing strategy to devise a high likelihood of detecting the RFID tags present.

In another embodiment, the interrogation system includes an asset tracking or inventory management database associated with the computer 101 of FIG. 1. The database maintains a list of the products and their associated RFID tags and, in addition, maintains data on items and sets of items expected to be observed by the interrogators 120, 122, 124, 126. In this embodiment, reading any RFID tag 130, 132, 134, 136 from a group can provide the information to infer other RFID tags 130, 132, 134, 136 likely to be present. In addition, reading the RFID tag 130, 132, 134, 136 on the carrier, for example, including a pallet, bin or tote, uniquely provides the data expected to be observed on the RFID tags 130, 132, 134, 136 affixed to the items associated with that carrier. Thus, autocorrelation can be performed to verify the presence of expected items and the presence of unexpected items can also be noted. This use of the interrogation system is of particular value in the presence of an enterprise information technology system that contains data records that associate the pallet, bin or tote RFID tag with an inventory of goods and with the RFID tags expected to be affixed to the inventory. The interrogation system can therefore augment a warehouse management system.

An additional feature associated with the interrogation system is to provide an accessibility to a master database 111 of RFID tag data as illustrated in FIG. 1. For example, a number of such master databases 111 have been proposed for use with EPC RFID tags. Thus, it is possible to predict the registered data patterns associated with a given GTIN. Another feature associated with the interrogation system would be to predict the registered data patterns for a given combination such as the patterns associated with a given GTIN and a particular supplier. Additionally, patterns of customer usage can be developed for the purposes of signal processing. For example, in the case of mixed product pallets, the statistical relationships can be developed among the data fields observed over a period of time.

Additionally, the interrogation system can be employed with pseudorandom noise (PN) codes. The PN codes exhibit a number of characteristics designed for a balanced set of performance characteristics including substantial orthogonality (e.g., having cross correlation characteristics among RFID tags in the set to be very small), substantial balance (e.g., having nearly an equal number of permissible logical states or levels, which usually means a nearly equal number of ones and zeros in two leveled bit sequences), a sharp autocorrelation peak, a deterministic relationship among a family of codes, and the capability of being derived deterministically in a variety of physical implementations of limited capacity.

The interrogation system can use PN codes with the additional characteristic of having the family of codes exhibit a tree structure. The concept of code trees is familiar to those skilled in the art and it describes a class of PN codes which have the characteristics described previously, and additionally the characteristic of being deterministically related in their signal processing characteristics and their derivation (e.g., orthogonal variable spreading factor codes).

The characteristics of being pseudorandom, approximately orthogonal, balanced, and having a sharp autocorrelation peak provide desirable signal processing characteristics for the interrogation system. Additional signal processing gain can be achieved by adding deterministic relationships among codes, which means that one RFID tag detected among a group of RFID tags can provide a deterministic mechanism of searching for undetected RFID tags with increased signal processing gain. A rule of thumb familiar to those skilled in the art is that the number of PN codes available given a bit sequence of finite length, n, is roughly $n^2$ or less. Thus, the number of unique PN codes available for an RFID tag with 96 bits is about 100×100 or about 100,000. This is far less than the number of unique bit combinations available from a 64-bit RFID tag, which as previously stated, are 18,446,744,073,709,551,616. So, it is desirable to provide more codes with unique identifiers, and to preserve the signal processing characteristics of the PN sequence.

One way to increase the number of codes is to define a family of codes based on a set of deterministic rules, such that the PN sequence for each member of the family of codes is deterministic and can be stored in a database or computed by a digital signal processor or a computer. A short message such that the number of bits therein is less than the length of the family of codes is then impressed thereon. This could be performed by an "XOR" process familiar to those skilled in the art. Then, another data sequence such that this second data sequence is shorter than the first data sequence is impressed, and so on.

A number of so-called tree codes exist associated with PN sequences for signal processing and security. The class of codes may be characterized by relational inheritance. That is, codes at lower levels (e.g., the branches) inherit the characteristics of higher levels. Also, the autocorrelation characteristics are such that parallel branches can be discriminated. In some cases, such tree codes are used to selectivity disable (in the sense of autocorrelation discrimination) some branches or sub branches, while leaving parallel branches unchanged. In other words, the signal processing gain can be reduced or eliminated for one group of RFID tags, but not for the balance of the population.

If the length of the PN sequence is n, the length of the first data sequence is m, and the length of the third data sequence is q, then we expect to have roughly the following number of available sequences, namely, $n^2 \times 2^m \times 2^q$. So, for an RFID tag with 512 bits used for a PN sequence impressed with a first data message of 32 bits, and a second data message of 4 bits, we expect that, roughly, $512^2 \times 2^{32} \times 2^4$ or, 262,144×4,294,967,296×16 or 18,014,398,509,481,984 (e.g., approaching $2 \times 10^{16}$) codes are available. Searching randomly across such a large body of codes would require more time and more expensive processing than would be desirable in most cases. Therefore, a mechanism such as introduced below to reduce the complexity of such a search would be advantageous.

Figure 4:
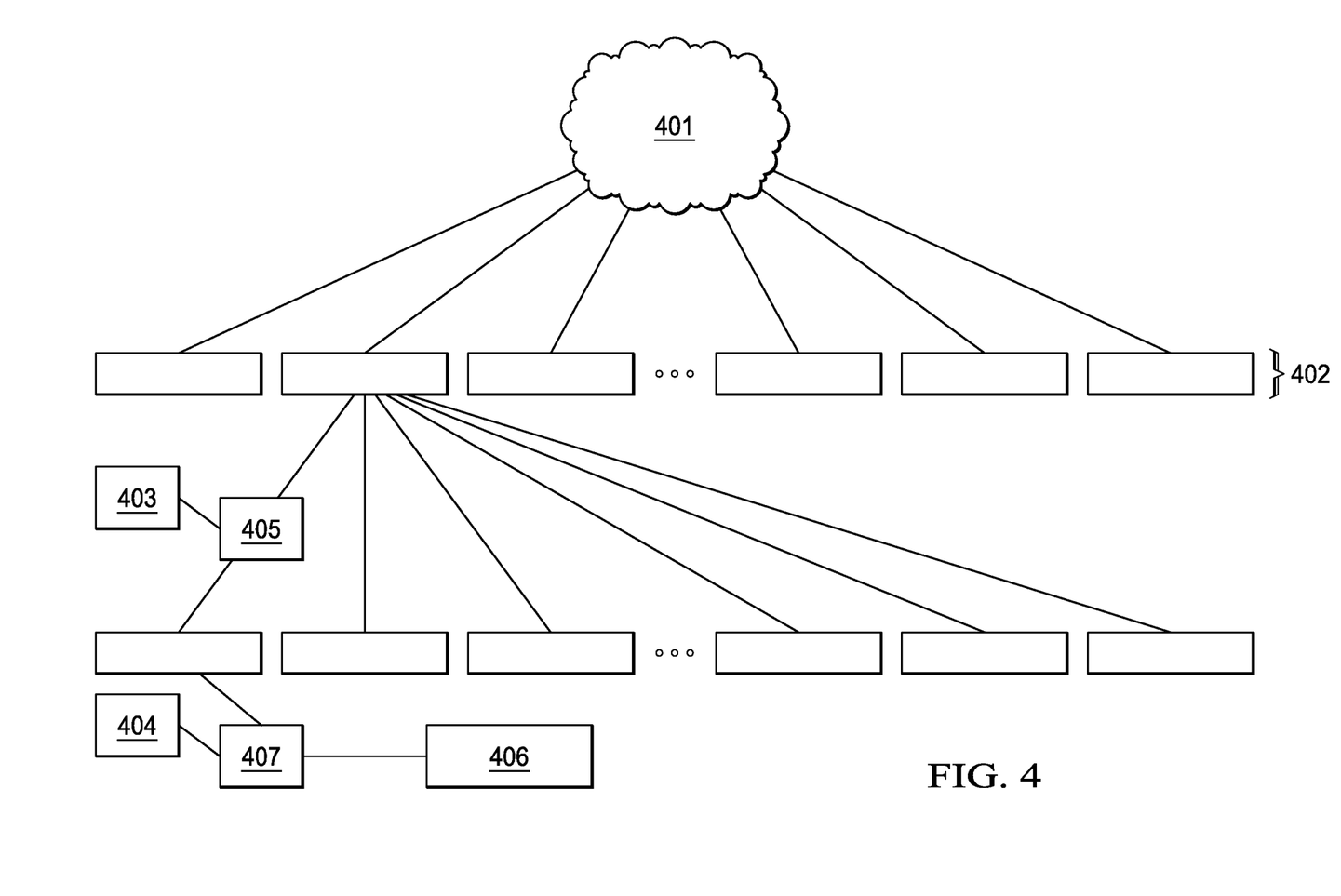
FIG. 4 illustrates a system level diagram of an embodiment of a tree structure representing a deterministic approach of searching for undetected RFID tags in accordance with an interrogation system constructed according to the principles of the present invention.

Turning now to FIG. 4, illustrated is a system level diagram of an embodiment of a tree structure representing a deterministic approach of searching for undetected RFID tags in accordance with an interrogation system constructed according to the principles of the present invention. The illustrated embodiment represents a tree structure formed from a family of codes 401 akin to tree structures employed in mobile telephony. A search strategy to address the family of codes 401 is to first search for the PN sequences 402 without reference to impressed data. When the correct member of the family of codes 401 has been detected, that single member of the PN sequences 402 can be used with the XOR (or similar) process 405 to decode a first data message 403, and having decoded this information, the process is repeated with an XOR process 407 to decode a second data message 404. In this example, the result is a digital sequence to be loaded into an RFID tag 406. Thus, only about $1/(n^2)$ of the total members of the family of codes 401 is searched, which is a very powerful mechanism of reducing the complexity of such a technique.

The PN codes have long been associated with cryptographic techniques, as familiar to those skilled in the art. A related use of such tree-based codes also embodies cryptological features. Using an encrypted sequence provides a method of reducing fraud and counterfeiting, which is extremely desirable for applications such as pharmaceutical packaging or for identifying casino game items such as dice. In these cases, it is desirable to use relational database principles previously described to note any anomalies. In other words, using established patterns to warn of circumstances outside the norm, as occurs when dice are substituted or when pharmaceutical packaging RFID tags have anomalies in the data sequence.

In the illustrated embodiment, detection of the information stored in lower levels of the tree structure is performed by post processing stored digital base band data, as previously described. Note too, that multiple reads may be combined to improve signal-to-noise ratio, thereby reducing the bit error rate for the lower level tree elements, and in some cases for the top level as well. Moreover, when the interrogation system includes wireless subsystems or infrastructure wherein tree structures may already be used to advantage, it may be preferable to employ a tree structure that is related to the tree structure of the wireless infrastructure to potentially reduce the number of codes to search and the number of correlators.

Another feature of the interrogation system of the present invention is that it allows the use of a "bad read." Conventional systems either attempt to judge each response in terms of a "good read" or a "bad read." This is undesirable from several points of view. First, there is a non-zero chance that a so called "good read" contains bit errors. By use of the statistical correlation and/or autocorrelation techniques presented herein, the chances are improved that a false positive (calling a bad read good) will be detected. Second, there is a non-zero chance that information from so called "bad reads" can be used, with the statistical correlation and/or autocorrelation techniques presented herein to synthesize a good read.

Additionally, as mentioned above, a database with relational features such that relationships previously known or relationships which are probable can be used to guide the selection of signal processing techniques and autocorrelation codes of the interrogation system. As an example, if a given manufacturer makes only one product type, then a probability exists that other RFID tags in a group will have the same product type data field. Moreover, there is a certainty that all of the RFID tags for products from that manufacturer will have the same data in both the product type data field and the manufacturer field.

The interrogation system of the present invention also contemplates the use of multiple RFID tags affixed to a single item. For example, consider a high value item such as a bottle of pharmaceuticals or a casino chip wherein it may be desirable to affix two RFID tags thereto. One RFID tag could have a bit pattern optimized for signal processing such as those derived from PN codes and may have a short data load indicating the type of drug or the denomination of the chip. The second RFID tag could make full use of the data range, providing billions of serial numbers, date of manufacture, and so on. The second RFID tag could be fully complaint to data protocols that do not envision PN codes or other signal processing techniques. Thus, either RFID tag could be used to cue the interrogation system as to the best strategy for reading the other RFID tag. Also, spare fields provided by some RFID tag standards may be used with bit patterns optimized for signal processing and other fields may be used for their normal purposes. Any of the fields of the RFID tag can be used to cue for the best strategy for reading the other RFID tags.

In some embodiments of the present invention, great benefit can be derived from spatial relationships. As described U.S. patent application Ser. No. 10/841,192 entitled "Weapon and Weapon System Employing The Same," to Roemerman, et al., filed May 7, 2004, which is incorporated by reference, spatial relationships can be used to predict the approximated location data characteristics of RFID tags, which have not yet been detected, or have not yet been identified. In the case of the present invention, these spatial relationships can be used to predict part or all of a bit pattern of an RFID tag before the tag is interrogated, which is a powerful advantage in terms of signal processing gain. It will also be seen that when the present invention also embodies the SAR/ISAR characteristics described U.S. Pat. No. 7,530,315 entitled "Weapon and Weapon System Employing the Same," to Tepera, et al., issued May 12, 2009, which is incorporated herein by reference, the combination of these methods provides a very powerful mechanism of detecting and locating RFID tags.

Thus, the interrogation system of the present invention provides a system for counting and monitoring items and communicating with items such as bins and pallets with RFID tags. An interrogator of the interrogation system includes a transmitter for interrogating items. A control system embodied, for instance, in a computer is incorporated within the interrogation system for receiving responses from the RFID tags, for maintaining a record or database of observed responses, and then using these prior observations for estimating the characteristics of items which may be present, or not yet observed.

The interrogation system may include one or a plurality of interrogators with a transmitter(s) for signaling to the RFID tags and a receiver(s) for accepting the response from the RFID tag. Any type of radio frequency compatible system may be employed with the interrogation system. For example, the interrogation system is compatible with all types of RFID tags including passive, semi-active and active tags employing reporting mechanisms including passive as well as powered backscatter techniques and active responses not of the backscatter type. The interrogation system is compatible with RFID tags whose digital contents have been prepared to take advantage of the principles taught herein. The interrogation system is compatible with RFID tags and communication systems operating at any frequency. The interrogation system is still further compatible with RFID tags having a small number of digital bits and RFID tags having very large numbers of digital bits.

The processes and methods compatible with the interrogation system include a process wherein the system processes a first signal reply from an initial interrogation sequence and, in subsequent interrogations, uses the information from that first signal as a means of decoding the first signal for additional information in post processing from that sequence, and also for obtaining information which aid in the detection of subsequent signals generated by other responders. These responders typically include RFID tags. While it is clearly understood that the principles taught herein are directly applicable to RFID-based systems, the principles of the present invention are equally applicable to other systems wherein a query from a first item acting as a query source at one location is meant to be followed by a response from a second item at a different location wherein the responding item provides some information to the querying item. The separation distance can be relatively small (e.g., less than one inch) or quite large (e.g., greater than one mile).

The principles of the present invention are applicable to systems, methods and processes for estimating the digital information likely to be contained within the signal of a transponder such as an RFID tag. For instance, it is advantageous to use some or all of the data from one transponder for autocorrelation purposes in enhancing the detection of other transponders. Also, the use of prior knowledge is beneficial to predict autocorrelation functions for detecting multiple transponders. A combination of data from one transponder and prior knowledge can also be used to predict autocorrelation functions for detecting multiple transponders. The interrogation system also employs predictive autocorrelation functions for detecting a single transponder under degraded signal-to-noise or signal-to-interference ratio conditions as opposed to conventional readers that provide clearly unsatisfactory results. A multi-port interrogation system may also be employed to advantage wherein antenna diversity and aperture management processes provide improved signal-to-noise ratio and signal to interference ratio, and the management of antenna diversity and aperture is based on repeated observations, such that prior observations provide the basis for subsequent observations wherein the likelihood of successful subsequent transponder sequences is enhanced as a result of the prior observations. In accordance therewith, the multi-port interrogation system provides signal processing gain derived from autocorrelation methods.

The principles as described herein also employ a family of codes with good autocorrelation characteristics and having a high degree of predictability. This predictability is highly desirable in the context of the other techniques described herein. Additionally, the interrogation system and method provides for the post processing of signals for the purposes of improving signal-to-noise ratios, signal-to-interference ratios, and increased signal processing gain, to gain additional information including learning patterns that might represent business rule violations, and also for avoiding the delay of material movements, to name a few.

For a better understanding of communication theory and radio frequency identification communication systems, see the following references "RFID Handbook," by Klaus Finkenzeller, published by John Wiley & Sons, Ltd., $2^{nd}$ edition (2003), "Technical Report 860 MHz-930 MHz Class I Radio Frequency Identification Tag Radio Frequency & Logical Communication Interface Specification Candidate Recommendation," Version 1.0.1, November 2002, promulgated by the Auto-ID Center, Massachusetts Institute of Technology, 77 Massachusetts Avenue, Bldg 3-449, Cambridge Mass. 02139-4307, "Introduction to Spread Spectrum Communications," by Roger L. Peterson, et al., Prentice Hall Inc. (1995), "Modern Communications and Spread Spectrum," by George R. Cooper, et al., McGraw-Hill Book Inc. (1986), "An Introduction to Statistical Communication Theory," by John B. Thomas, published by John Wiley & Sons, Ltd. (1995), "Wireless Communications, Principles and Practice," by Theodore S. Rappaport, published by Prentice Hall Inc. (1996), "The Comprehensive Guide to Wireless Technologies," by Lawrence Harte, et al, published by APDG Publishing (1998), "Introduction to Wireless Local Loop," by William Webb, published by Artech Home Publishers (1998) and "The Mobile Communications Handbook," by Jerry D. Gibson, published by CRC Press in cooperation with IEEE Press (1996). For a better understanding of conventional readers, see the following readers, namely, "MP9320 UHF Long-Range Reader" provided by SAMSys Technologies, Inc. of Ontario, Canada, "MR-1824 Sentinel-Prox Medium Range Reader" by Applied Wireless ID of Monsey, N.Y. (see also U.S. Pat. No. 5,594,384 entitled "Enhanced Peak Detector," U.S. Pat. No. 6,377,176 entitled "Metal Compensated Radio Frequency Identification Reader," U.S. Pat. No. 6,307,517 entitled "Metal Compensated Radio Frequency Identification Reader"), "2100 UAP Reader," provided by Intermec Technologies Corporation of Everett, Wash. and "ALR-9780 Reader," provided by Alien Technology Corporation of Morgan Hill, Calif. The aforementioned references, and all references herein, are incorporated herein by reference in their entirety.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An interrogation system employable with an object and a plurality of radio frequency identification (RFID) tags on accompanying objects, comprising:
   a database having prior knowledge about said object;
   an interrogator configured to scan said plurality of RFID tags on said accompanying objects and discern additional information from at least one of said plurality of RFID tags about said object; and
   a control system configured to employ said prior knowledge and said additional information to obtain a signal processing gain to identify a type of said object.

2. The interrogation system as recited in claim 1 wherein said control system is configured to identify whether said object belongs with one or more of said accompanying objects.

3. The interrogation system as recited in claim 1 wherein said interrogator is configured to increase a sensitivity of said interrogation system.

4. The interrogation system as recited in claim 1 wherein said database is a relational database.

5. The interrogation system as recited in claim 1 wherein said interrogator includes a transmitter, a receiver and an autocorrelator.

6. The interrogation system as recited in claim 1 wherein at least one of said plurality of RFID tags employs at least one pseudorandom noise code or identification codes according to a tree structure.

7. The interrogation system as recited in claim 1 wherein said interrogator is configured to scan said plurality of RFID tags at a plurality of power levels.

8. The interrogation system as recited in claim 1 wherein said database, interrogator and control system are embodied in separate systems.

9. The interrogation system as recited in claim 1 wherein said interrogator is configured to discern said additional information from a portion of at least one of said plurality of RFID tags.

10. The interrogation system as recited in claim 1 wherein said control system is configured to process said additional information to identify another object with an RFID tag.

11. A method of operating an interrogation system employable with an object and a plurality of radio frequency identification (RFID) tags on accompanying objects, comprising:
    providing prior knowledge about said object;
    scanning said plurality of RFID tags on said accompanying objects and discerning additional information from at least one of said plurality of RFID tags about said object; and
    employing said prior knowledge and said additional information to obtain a signal processing gain to identify a type of said object.

12. The method as recited in claim 11 wherein employing includes identifying whether said object belongs with one or more of said accompanying objects.

13. The method as recited in claim 11 wherein said scanning and said discerning increases a sensitivity of said interrogation system.

14. The method as recited in claim 11 wherein said providing said prior knowledge about said object is performed in accordance with a relational database.

15. The method as recited in claim 11 further comprising performing an autocorrelation process to discern said additional information.

16. The method as recited in claim 11 wherein said at least one of said plurality of RFID tags employs at least one pseudorandom noise code or identification codes according to a tree structure.

17. The method as recited in claim 11 wherein said scanning said plurality of RFID tags is performed at a plurality of power levels.

18. The method as recited in claim 11 wherein said providing, said scanning and said discerning, and said employing are performed in separate systems.

19. The method as recited in claim 11 wherein said discerning is discerned from a portion of at least one of said plurality of RFID tags.

20. The method as recited in claim 11 further comprising identifying another object with an RFID tag in accordance with said additional information.

* * * * *